April 20, 1965
J. M. LIEBMANN
3,179,386
CONTROL OF SCALE IN HUMIDIFIERS
Filed March 11, 1960
5 Sheets-Sheet 2
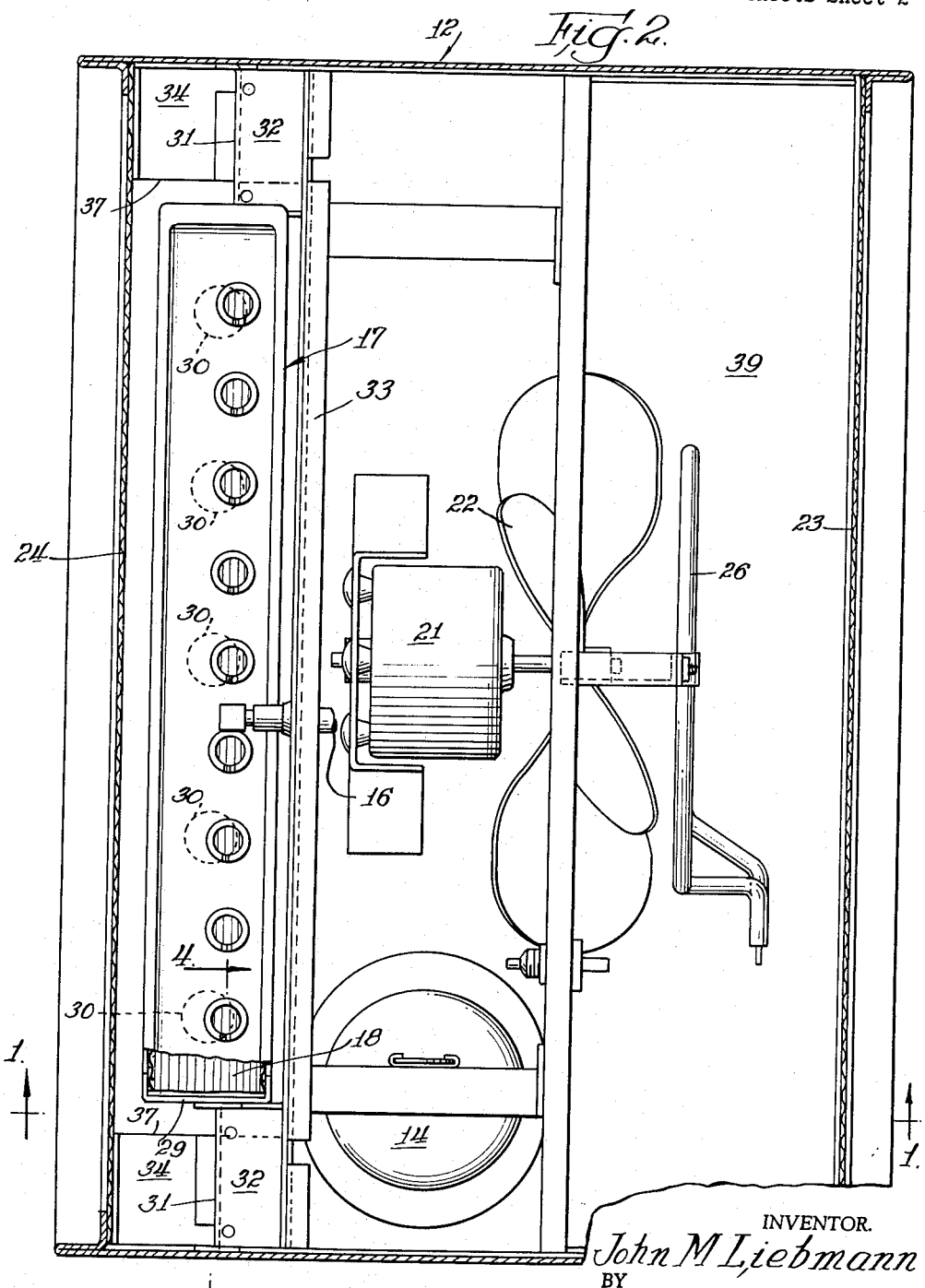
INVENTOR.
John M. Liebmann
BY
Jones, Dacbo & Robertson
Attys.

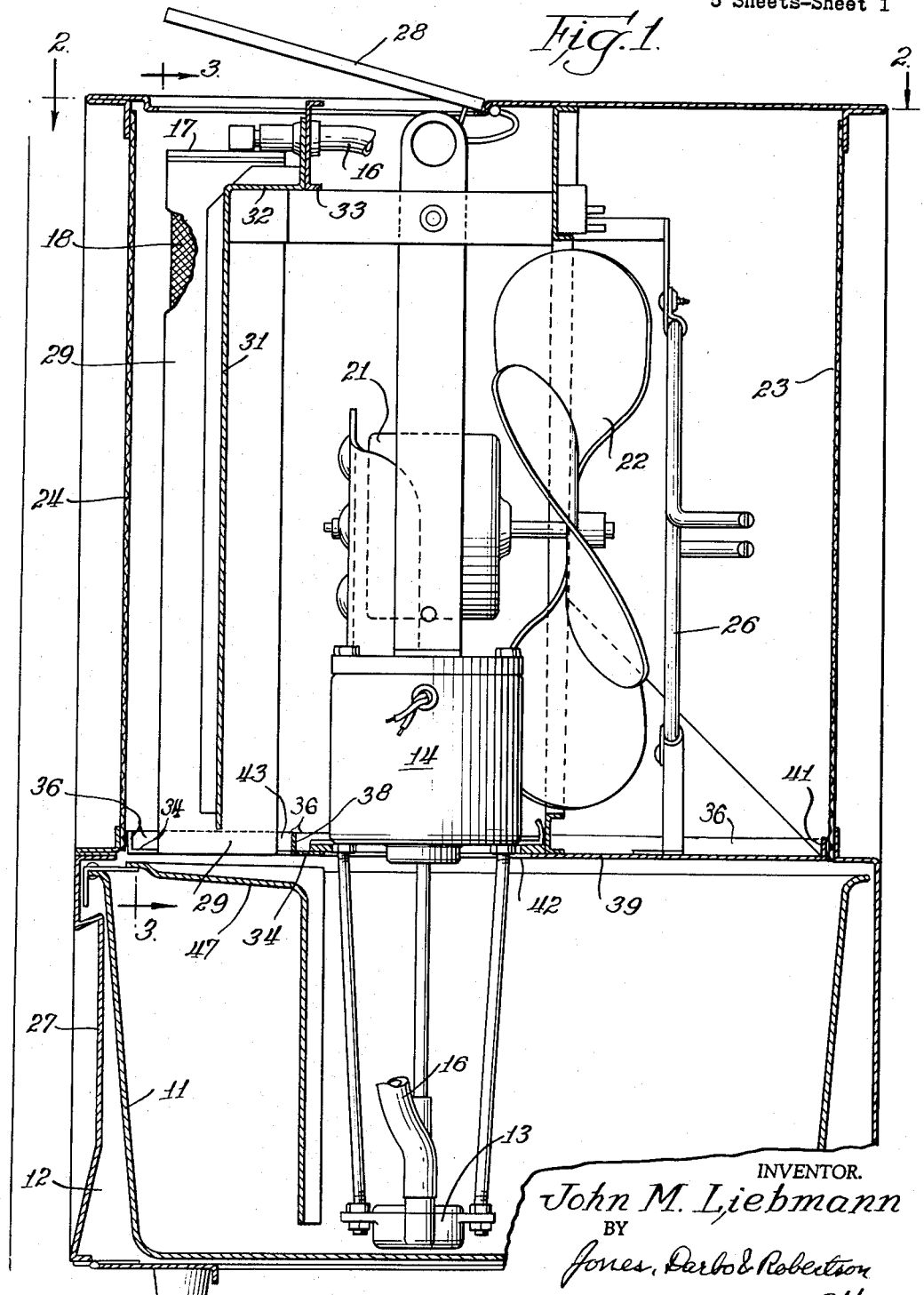

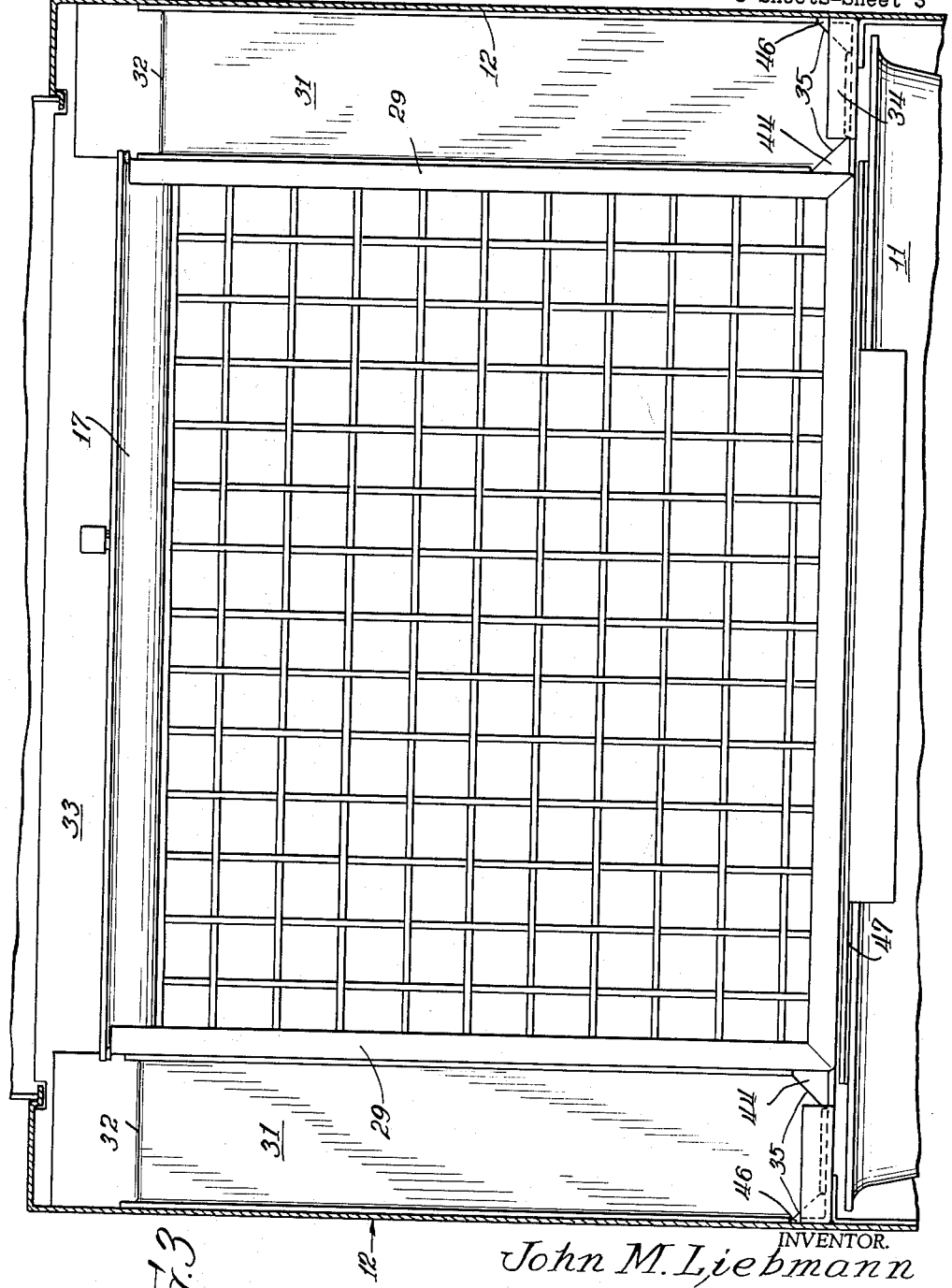

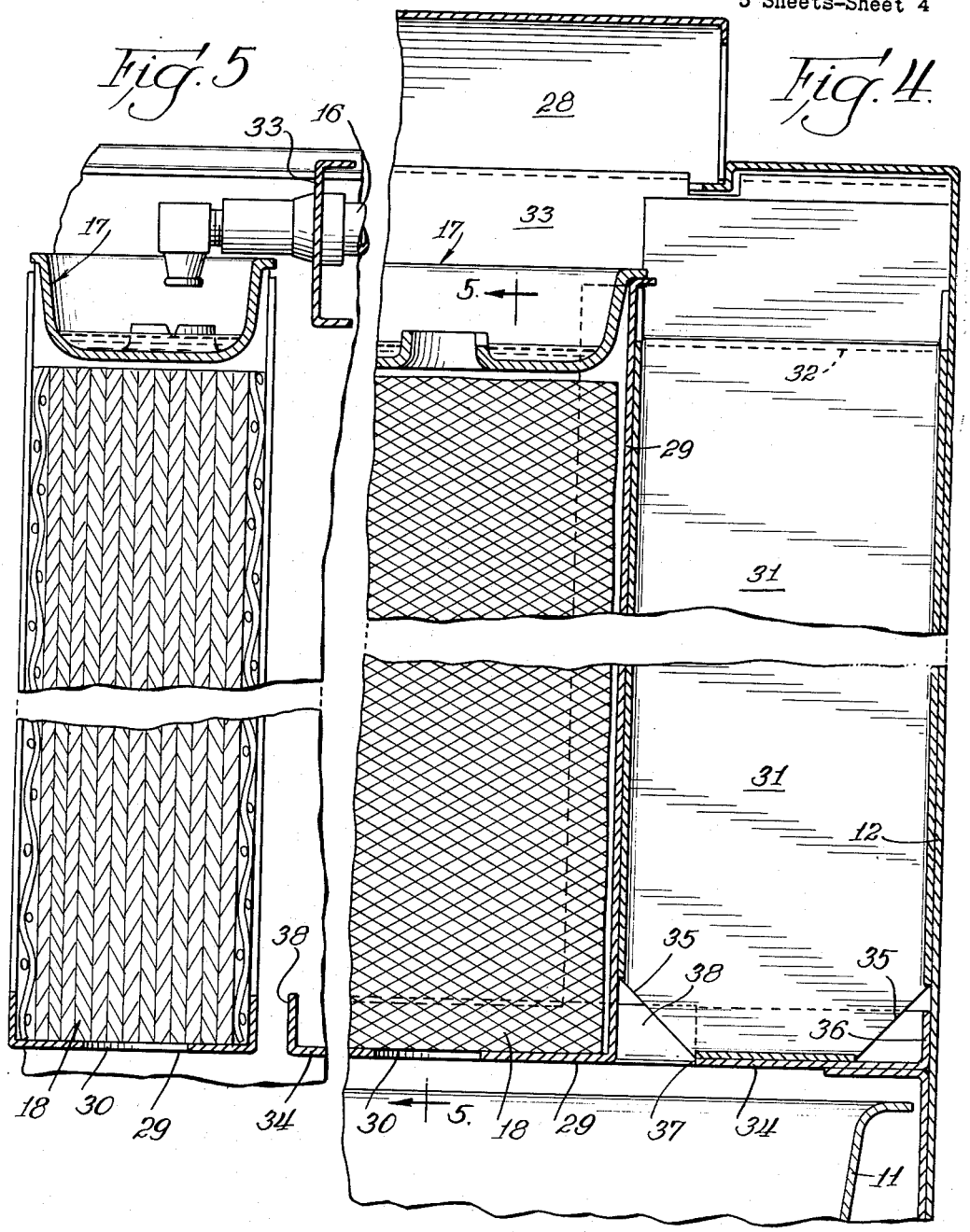

INVENTOR.
John M. Liebmann

United States Patent Office 3,179,386
Patented Apr. 20, 1965

3,179,386
CONTROL OF SCALE IN HUMIDIFIERS
John M. Liebmann, Madison, Wis., assignor to Research Products Corporation, Madison, Wis., a corporation of Wisconsin
Filed Mar. 11, 1960, Ser. No. 14,475
8 Claims. (Cl. 261—29)

The invention herein disclosed is particularly useful in portable humidifiers commonly used in homes and apartments and especially humidifiers in which water is recirculated over air-pervious contact pads from which the water evaporates to humidify a current of air. In this field there has been a troublesome problem of avoiding the external dripping of water due to its being carried from its intended path by salt incrustation in the humidifiers.

In the northern United States, the average home requires about 10 to 15 gallons of water per day for adequate humidification in winter. The water required by portable humidifiers may be supplied by a float valve in a water line, but is more frequently supplied by occasionally pouring from a pail into a reservoir or sump. Water is then recirculated over the contact pad by means of a pump. Some of the water is evaporated each time it is recirculated while the balance returns by gravity to the sump. Although distilled water would be ideal, or any water containing no mineral matter, tap water is naturally used because of its convenience and economy. Tap water contains mineral matter in concentrations which may vary from a few grains per gallon to forty or more. Furthermore, the water being circulated over the contact pad may remove additional matter from the air so that during the heating season several pounds of scale-forming material may collect in the system. Due to evaporation from the contact pad, the salts in the water in the sump become more and more concentrated, and this concentration runs considerably higher in the water on the pad as it trickles downward. In consequence, while the deposition of scale occurs to some extent throughout the system, it is especially heavy in the area of the contact pad, and particularly along the bottom thereof. Unfortunately, the deposition occurring within the pad continues to grow out from the lower portion of the pad. The accretions thus formed are tenacious and being also porous act as wicks to conduct water laterally by capillary action and downwardly by gravity. Further evaporation of the water so conducted results in an extension of the area on which scale continues to grow. Hence, the water has eventually leaked from the humidifier cabinet and has been known to cause considerable damage. Furthermore, the growth of scale may become so extensive at the bottom margins of the pad as to more or less lock it to contiguous structural supports.

In solving the problem, the present invention utilizes the fact that if the pad hung free, there would be no bridges for the water to follow to a point from which it could drip outside of the housing. It was not at first clear how this idea could be used without having air blown by the fan by-pass the contact pad. It has been the practice to provide a panel extending from the outer housing to the pad-holding frame. But this invention is based on the further finding that the panel can be kept almost as it was, a small gap (which does not by-pass enough air to be significant) being left only in the vicinity of the bottom of the pad. Surprisingly, the deposited encrustation does not readily bridge this gap, even though it would quickly grow to the width of the gap if the gap were not there.

In short, the problem is solved, or at least greatly reduced, by the surprisingly simple expedient of leaving a narrow gap all around the contact pad in the vicinity of the bottom thereof.

This small gap is sufficient because of certain cooperating factors. It reduces the outward accretion of salts at the bottom, where it has previously been excessive, and it provides an impedance to the outward movement of water. If any water emerges along the vertical sides of the pad supporting rack, it has a ready path downwardly to drip off harmlessly so that a small impedance is enough to prevent outward seepage which otherwise could at least cause water to collect on supporting structure in contact with bottom edge of the previous growth to there evaporate and provide more rapid outward accretion.

Other objects and advantages of the invention reside in the novel features of construction hereinafter described.

*Designation of figures*

FIG. 1 is a vertical sectional view of one form of the invention chosen for illustration taken approximately along the line 1—1 of FIG. 2.

FIG. 2 is a horizontal sectional view taken approximately along the line 2—2 of FIG. 1 just below the top wall of the device.

FIG. 3 is a fragmentary vertical sectional view taken approximately along the line 3—3 of FIG. 1.

FIG. 4 is a fragmentary sectional view on a large scale, broken away in its middle areas, and taken approximately along the line 4—4 of FIG. 2.

FIG. 5 is a view similar in nature to FIG. 4 but taken approximately along the line 5—5 of FIG. 4.

*General description of main embodiment*

Figure 6:
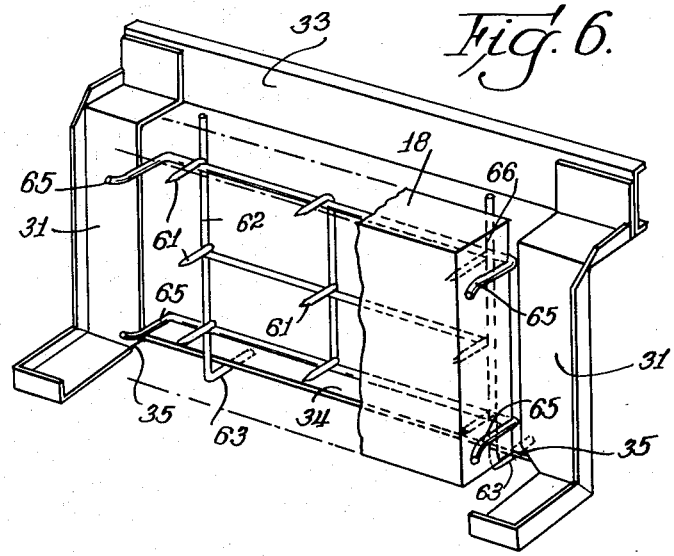
FIG. 6 is a fragmentary sectional perspective view showing a modification of the invention.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

The general arrangement of the type of humidifier for which the present invention was developed and in which it has proved to be quite beneficial is seen in FIG. 1. A pan or reservoir 11 resting on the bottom of main housing 12 holds a supply of water to be evaporated. A pump 13 driven by a motor 14 pumps water through a tube 16 into a distribution pan 17 from which it is distributed uniformly over the top of contact pad 18 having multitudinous air passages through it. The water percolates or trickles through pad 18 and from the bottom thereof the water that is not evaporated flows back into reservoir pan 11. At the same time a motor 21 rotates fan 22 to draw air in through a grille or screen 23, blow it through the contact pad 18 and out through a grille or screen 24, evaporating moisture from the pad 18 so that the air is thus humidified. An electric heater 26 in the path of the air may be operated to warm the air so that it will evaporate more moisture and will not have the chilling effect upon human skin in the path of the outgoing stream which might otherwise be objectionable.

A door 27 may be opened for drawing the reservoir partly out of the housing for filling it, or (after lifting pump 13) all of it out for cleaning.

A second door or cover 28 may be opened for removal of the contact pad 18 and replacing it with a fresh contact pad. For this purpose the tube 16 is moved aside and the distributor pan 17 is first removed, whereupon the pad 18 can be slid upwardly from its holding frame or rack 29 which is channel-shaped in cross section, as seen in FIGS. 2 and 4, and as seen in FIG. 3 is U-shaped when viewed from the front. The bottom length of the U is perforated along its bottom as at 30 (FIG. 4) to allow water to pass through it to the reservoir 11.

*The present invention*

As is perhaps seen best in FIGS. 1, 4 and 5, the bottom of the U-shaped racks 29 holding the contact pad 18 is completely surrounded by a narrow zone of air. The by-passing of air around the outside of frame 29 is nevertheless substantially prevented. Thus on the sides of the frame 29, the flow of air is substantially prevented by panels in the form of plates 31 which are in contact with, and perhaps spot welded to, the sides of rack 29, and are in contact with main housing 12. As seen best in FIG. 1 the upper ends of plates 31 are bent rearwardly at 32 and secured to a cross brace 33 which holds the water tube 16 and which is engaged or approximately engaged by the cover 28 when the cover closes.

The lower end of each panel 31 is cut back at its corners along the lines 35 and is secured to a flanged bottom plate 34 which is in contact with housing 12. The plate 34 has an upwardly turned peripheral flange 36 which tends to cause any water which finds its way onto it to flow inwardly to drop into reservoir pan 11, as over the edge 37. The plate 34 extends the full width of the housing 12 and is provided with a second flange 38 positioned at least one eighth of an inch rearwardly from rack 29. The plate 34 could be a separate plate, but as illustrated is the forward area of a plate also forming panel 39 which forms the bottom of the chamber housing the motors and fan and which is provided with an upwardly extending flange 41 at its rear edge as a continuation of peripheral flange 36, so that any water that finds its way on to panel or deck 39 tends to drop through hole 42. If water were expected to reach plate 34, the edges 37 and the edges of hole 42 could be depressed to ensure that dripping would be from them even if the humidifier were not quite level.

Forwardly of the rack 29, there is nothing between it and exit screen 24, except an air space.

From the foregoing it is seen that the panels 31 form a curtain substantially preventing the by-passing of air around the side of the rack 29. Looking at FIG. 1, a very small quantity of air can pass downwardly through the gap 43 and past the bottom of rack 29. Only a trifling amount of air can pass through the small triangular gaps 44 of FIG. 3. Obviously this total quantity of by-pass air is negligible, and in fact an extra little triangular aperture 46 (FIG. 3) is provided at the corner of each panel 31 merely for the sake of making the two panels 31 identical for purposes of economy.

The by-passing of air may be somewhat further reduced by drip plate 47, seen best in FIG. 1. Although this drip plate is located close below the rack 29 for the purpose of catching dripping water before it can drop far enough to make an audible splash, its proximity to rack 29 also reduces the flow of by-passing air and exposes even this air to water on the top of drip plate 47. The drip plate 47 slopes slightly throughout the area below the rack 29, and rearwardly thereof is bent downwardly and extends almost to the bottom of reservoir pan 11 so that even when the water level is low the water running down drip plate 47 will not drop far enough to make an audible drip. Entrainment of dripping water in the air is avoided by virtue of the fact that where the water drips (from holes 30, FIG. 4) the air flow area is enough wider than elsewhere (passage 43) so that the air speed is slow.

Figure 7:
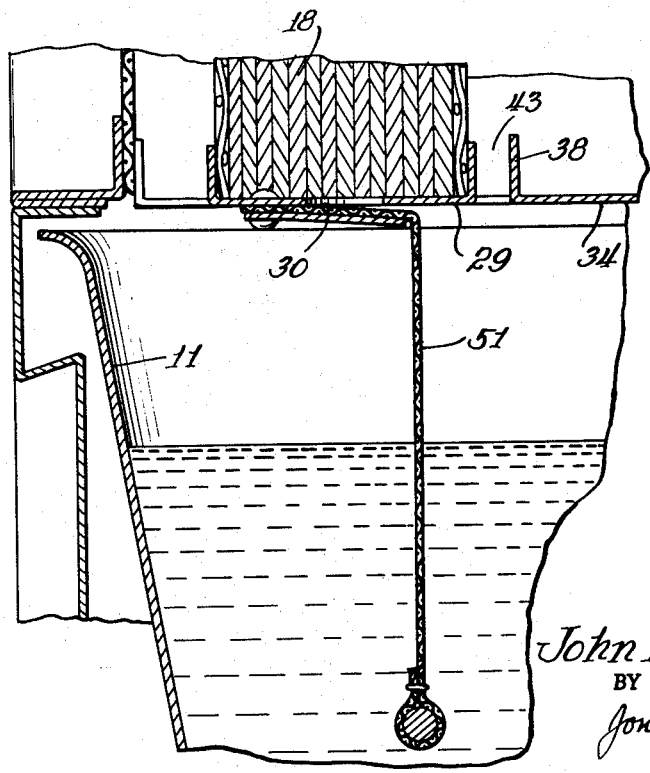
FIG. 7 is a fragmentary vertical sectional view through another modification of the invention showing especially a hanging curtain for reducing the by-pass of air.

The by-passing of air can be still further reduced in the manner shown in FIG. 7. Here a skirt or curtain 51 hangs from rack 29 almost to the bottom of reservoir pan 11 so as to extend into the water, and extends almost the full width of pan 11. It is flexible to permit removal of the sump pan 11. This curtain substantially prevents the flow of by-pass air through gap 43 and around the bottom of rack 29. With the FIG. 1 construction a short curtain could extend down to loosely engage drip plate 47, perhaps having gaps to ensure the passage of any water dropping to its left. The downward extension of drip plate 47 then forms, in effect, a part of the curtain extending into the water. Drip plate 47 is carried by pan 11 and therefore does not interfere with its removal.

It should be understood that for simplification, the drip plate 47 has been omitted from beneath the apertures 30 in FIGS. 4 and 5, although it would be used there.

The pad 18 may be held by other means. For example, FIG. 6 shows a modified form of the invention in which the contact pad 18 is held on spikes 61 carried by a wire grid 62 which may be supported by cross member 33. As illustrated in FIG. 6, the grid 62 is steadied at its lower portion by rearward extensions or braces 63 secured to plate 34. Guides 65 center the pad 18 as it is applied to spikes 61. The front grille 24 (FIG. 1) should be removable in this form of the invention.

In FIG. 6 the contact pad 18 is again substantially surrounded at its bottom portion by an air space. The one exception to this is found in the rearwardly extending braces 63. However, these are far enough from the side faces 66 of contact pad 18 to minimize if not prevent the lateral escape of water. Braces 63 may extend rearwardly and upwardly to surely prevent the travel of water ladened with encrustants along these members. Also braces 63 may be omitted, the grid 62 then being supported from above only.

By-passing of air around the bottom of the pad 18 in this form of the invention can be minimized, and drip silenced, as seen in FIG. 1, except that the pad 18 would be exposed where frame 29 is shown.

Although experience may show that the side panels 31, except near the bottom, may seal against the lateral faces 66 of the contact pad 18 in the form of invention seen in FIG. 6 to prevent the by-pass of air around these faces of pad 18, it is at present deemed more safe to allow a slight clearance along the entire sides of pad 18. Because a greater clearance is required at the bottom, the bottom corners of panels 31, at least adjacent the pad 18, are as in the other forms of the invention, cut off to the lines 35.

The use of the rack or pad holder 29 is at present preferred because of greater certainty that it will prevent the external dripping which established the need for this invention. Accretion from the pad outwardly along the rack 29 has been found to be harmless, with this invention, inasmuch as any water which travels along the outside of the rack drips off harmlessly since there is no connecting structure at the bottom to catch the water and cause rapid growth of the encrustation.

It has been found that the peripheral clearance around the bottom of pad 18 (around the rack 29, if the rack is used) can be quite narrow. Even an eighth of an inch is very helpful and will be sufficient unless the pad is left in use longer than it should be without replacing it. Approximately one-quarter inch is preferred, however, and more may be desirable if adequate steps are taken otherwise to prevent excess by-passing of air. It should be understood that the pad 18 has a limited life of usefulness. Due to the deposition of minerals and air-borne particles in the pad, its resistance to the passage of air through it gradually increases. The pads should be replaced while there is still nearly full airflow through them, but they are sometimes neglected. The preferred one-quarter of an inch clearance allows for longer neglect.

Because the clearance functions by preventing the standing and evaporation of water where there would be rapid lateral accretion, it need not extend upwardly very far. It may be reduced upwardly as in the case of the edges 35 at the bottoms of panels 31. Although these provide more than the one-quarter inch clearance at the bottom of rack 29 where the accretion of minerals is greatest, the clearance between rack 29 and panel 31 reduces upwardly to zero only about three-fourths of an inch up from the bottom of the rack 29.

Air by-passing the pad and flowing under it where water is dripping may entrain droplets of water depending upon the velocity unless suitable baffles are arranged. The curtain hanging from the lower portion of the frame 29 shown in FIG. 7 is advantageous in stopping entrainment of moisture and in reducing the by-passing of air.

I claim:

1. Humidifying apparatus including a housing with ingress and egress apertures, a permeable water and gas contact pad, means to supply an excess of water to the upper portion of said pad to trickle downwardly through it including a sump entirely lower than the bottom of the pad receiving water from the pad and a pump recirculating water from the sump to the pad, and means to simultaneously circulate a stream of gas through said apertures and through said pad; said apparatus including means at the sides of the pad substantially confining airflow to the pad to substantially prevent the by-pass of air around the sides of the pad but providing an air gap substantially surrounding the lower portion of said pad, including areas at the lower sides of the pad.

2. Humidifying apparatus including a housing with ingress and egree apertures, a permeable water and gas contact pad, means to supply an excess of water to the upper portion of said pad to trickle downwardly through it including a sump entirely lower than the bottom of the pad receiving water from the pad and a pump recirculating water from the sump to the pad, and means to simultaneously circulate a stream of gas through said apertures and through said pad; said apparatus including means at the sides of the pad substantially confining airflow to the pad to substantially prevent the by-pass of air around the sides of the pad but providing an air gap extending at least one-eighth inch, outwardly at the lower sides of the pad.

3. Humidifying apparatus including a housing with ingress and egress apertures, a permeable water and gas contact pad, means to supply an excess of water to the upper portion of said pad to trickle downwardly through it, and means to simultaneously circulate a stream of gas through said apertures and in contact with said pad; said apparatus including means at the sides of the pad substantially confining airflow to the pad to substantially prevent the by-pass of air around the sides of the pad but providing an air gap substantially surrounding the lower portion of said pad, including areas at the lower sides of the pad.

4. Humidifying apparatus including a housing with ingress and egress apertures, a permeable water and gas contact pad, means to supply an excess of water to the upper portion of said pad to trickle downwardly through it, and means to simultaneously circulate a stream of gas through said apertures and in contact with said pad; said apparatus including means at the sides of the pad substantially confining airflow to the pad to substantially prevent the by-pass of air around the sides of the pad but providing an air gap extending at least one-eighth inch, outwardly at the lower sides of the pad.

5. Humidifying apparatus including a housing with ingress and egress apertures, a permeable water and gas contact pad, means to suply an excess of water to the upper portion of said pad to trickle downwardly through it, a sump receiving water from the pad and means to simultaneously circulate a stream of gas through said apertures and in contact with said pad; said apparatus including means at the sides of the pad substantially confining air flow to the pad to substantially prevent the bypass of air around the sides of the pad but providing an air gap substantially surrounding the lower portion of said pad, including areas at the lower sides of the pad, and a curtain extending close beneath the drip area of the pad and deep into the sump.

6. Humidifying apparatus comprising a housing divided by a generally horizontal deck, a permeable water and air contact pad extending generally vertically upward from said deck and of open nature to permit easy air flow through it, means for supplying water to the upper part of the pad, means below the deck for receiving excess water from the pad, and means for circulating a stream of air above the deck and through the pad; said deck having a generally vertical flange spaced from the pad by a narrow clearance and opening to the stream of air in a direction generally perpendicular to it whereby flow of air downwardly through said clearance to by-pass the pad is minimized, and means obstructing flow of air around the vertical ends of the pad but leaving adjacent the bottom of the pad a narrow clearance forming a continuation of the first named clearance.

7. Humidifying apparatus comprising a housing divided by a generally horizontal deck, a permeable water and air contact pad extending generally vertically upward from said deck and of open nature to permit easy air flow through it, means for supplying water to the upper part of the pad, means below the deck for receiving excess water from the pad, and means for circulating a stream of air above the deck and through the pad; said deck being spaced from the pad by a narrow clearance which opens to the stream of air in a direction generally perpendicular to it whereby flow of air downwardly through said clearance to by-pass the pad is minimized, and means obstructing flow of air around the vertical ends of the pad but leaving adjacent the bottom of the pad a narrow clearance forming a continuation of the first named clearance.

8. Humidifying apparatus comprising a housing with ingress and egress apertures, a permeable water and gas contact pad supported by a holding frame engaging its sides, a sump in the form of a slide-out vessel underlying said pad, means to supply an excess of water to said pad from said sump and means to simultaneously circulate a stream of gas through said apertures and said pad, characterized by having a curtain extending close beneath the drip area of the frame, and engaging the frame, extending deep into the sump, and extending nearly the full length of the pad bottom to reduce the by-pass of air, and said curtain being flexible to avoid interfering with removal and insertion of said sump.

References Cited by the Examiner

UNITED STATES PATENTS

| | | | |
|---|---|---|---|
| 1,903,301 | 4/33 | Snowden et al. | 261—29 |
| 2,137,905 | 11/38 | Church et al. | 261—97 X |
| 2,158,294 | 5/39 | Long. | |
| 2,588,612 | 3/52 | Brookins | 261—97 |
| 2,600,926 | 6/52 | Rudd | 261—97 X |
| 2,606,009 | 8/52 | Long | 261—97 X |
| 2,798,421 | 7/57 | Hardesty | 261—97 X |
| 2,850,269 | 9/58 | Bohanon | 261—97 |
| 2,934,022 | 4/60 | Rodick et al. | 261—20 X |

FOREIGN PATENTS 127,977   6/19   Great Britain.

HARRY B. THORNTON, *Primary Examiner.*

H. L. MARTIN, GEORGE D. MITCHELL, *Examiners.*